United States Patent Office 2,834,803
Patented May 13, 1958

2,834,803
PURIFICATION PROCESS

Gifford W. Crosby, River Forest, and Le Roi E. Hutchings, Crystal Lake, Ill., assignors to The Pure Oil Company, Chicago, Ill., a corporation of Ohio No Drawing. Application October 1, 1956
Serial No. 612,950

12 Claims. (Cl. 260—504)

This invention relates to a process for the preparation of petroleum sulfonates characterized by their ability to pass the water susceptibility tests described herein. More particularly, the invention relates to a process for the purification of crude petroleum sulfonic acids by treating with certain single solvents prior to neutralization, stripping off any sulfur dioxide present, mixing with water, and completely separating the resulting water phase from the oil-sulfonic acid-solvent phase. As an alternative method, in certain processes for the preparation of sulfonic acids, the single solvent may be added after the sulfur dioxide-stripping step and before the water-wash step.

It is known in the prior art that the sulfonic acid mixture resulting from the treatment of a sulfonatable material with sulfur trioxide or oleum contains undesirable materials such as sulfuric acid, sulfur dioxide, low molecular weight sulfonic acids, and those sulfonic acids which are very soluble in water, the so-called "green acids." Purification of the reaction mixture resulting from the treatment of a sulfonatable material with a sulfonating agent is difficult and is generally conducted after transformation of the sulfonic acids to a metal or ammonium salt. Certain low-boiling solvents, such as benzol, gasoline, carbon tetrachloride, ethylene chloride, ether, and aliphatic and aromatic hydrocarbons, have been disclosed as capable of precipitating certain of the metal salts of the sulfonic acids under prescribed conditions so that they may be dissolved in water from the oil-sulfonate mixture. However, only certain minimum amounts of water can be tolerated during the application of these methods for purifying the neutralized reaction mixture, and the pH of the mixture must be adjusted to below about 7.0 and above 3.0. Also, this method may not be as successfully applied to the removal of metal salts which are water-insoluble, e. g., barium sulfate. It has been found in accordance with this invention that the undesirable materials such as sulfuric acid, low molecular weight sulfonic acids and the green acids can be removed from sulfonic acid-oil mixtures, which are to be distinguished from mixtures of oil and salts of sulfonic acids (sulfonates), by washing the mixtures with water in the presence of a relatively water-insoluble single solvent, whereby the complete emulsification of the acid mixture with water, which occurs in the absence of a solvent, and the excessive extraction of desirable sulfonic acids by the water, which occurs with certain solvents and combinations of solvents, are prevented. Furthermore, when sulfur trioxide is the sulfonating agent, the water-washing step does not require prior separation of the oil and sulfuric acid phases, as in oleum sulfonation, which results in the loss of product to the acid phase. The products, after neutralization, are characterized by their ability to pass the water susceptibility tests.

Accordingly, it is a primary object of this invention to produce oil-soluble petroleum sulfonates in good yields which pass the water susceptibility tests by providing a method of purification of the sulfonic acid-oil reaction mixture prior to neutralization.

It is another object of this invention to provide a process for producing highly desirable petroleum sulfonates by treatment of the crude sulfonic acids, prepared using sulfur trioxide, with water in the presence of a single solvent selected from the group consisting of ketones of the general formula,

wherein R and R' are saturated alkyl groups having from 1 to 8 carbon atoms and the sum of the carbon atoms in these alkyl groups is at least 4 but not more than 9 carbon atoms, ethers of the general formula, R—O—R', where R and R' have a total of at least 5 but not more than 9 carbon atoms, and certain chlorinated or halogenated hydrocarbons, excluding such solvents as methyl ethyl ketone, acetone, low boiling ethers, carbon tetrachloride, and high boiling chlorinated or halogenated hydrocarbons.

A further object of this invention is to provide a method of purifying petroleum sulfonic acid mixtures before neutralization, said acids being characterized by the ability of their salts to pass the water susceptibility tests.

These and other objects of the invention will become apparent or be described as the invention is developed herein.

The invention relates to a certain sequence of steps and their relation to each other, including the following procedures. The crude petroleum sulfonic acid reaction mixture is treated with a single solvent of the class described, the mixture is stripped of any sulfur dioxide and subjected to water washing with the solvent present, and the resulting oil phase and water phase are completely separated. The purified, oil-soluble sulfonic acids, in good yields, are then neutralized and basic salts thereof are made by treatment with a metal base such as basic compounds of calcium, barium or strontium. As an alternative method, the single solvent may be added to the petroleum sulfonic acid mixture after the sulfur dioxide stripping step and before the water washing step. Another alternative, which is less preferable because of reduced yields, involves the treatment of the crude sulfonic acid-solvent mixture with successive portions of water prior to neutralization.

The "water susceptibility tests" which will be used as the criteria for evaluating the end-product of this invention are well known. While such tests do not normally appear in specifications for lubricating oils or lubricating oil additives, they are useful and significant in that they give an indication of the performance of finished oils containing the sulfonates with respect to potential emulsion formation with water, and also give an indication of the stability of the sulfonate-containing additive when in storage under adverse conditions, that is, for example, in wet tanks.

The water susceptibility test referred to in the specification as a "blend test" is a measure of the performance to be expected of the sulfonate when incorporated in a crankcase oil, and is conducted in the following manner: A finished blend of the oil and additive or additives, in proportions normally used in crankcase oil formulations, is first prepared and agitated for ½ hour at room temperature with 0.1% by weight of water present. The mixture is then observed for cloudiness and precipitation and allowed to stand. Additional observations of the amount of haze and/or insoluble materials present are made at the end of 24 and 48 hours standing. If the water separates quickly from the blend and leaves a clear solution, and if there is no precipitate formation, the blend is considered to have passed the test.

The second water susceptibility test is referred to as the "concentrate test." In this test, 4 parts by volume of a base oil, and 1 part by volume of the additive are blended together, and this concentrate is agitated for ½ hour in the presence of 1.0% by weight of water. After observation for haze and precipitates, it is placed in a constant temperature bath at 250° F. where it is agitated with nitrogen stripping for 2 hours to remove the added water. Again an observation is made and the test sample is allowed to stand. After 24 hours another observation is made and the amount of precipitate is noted and recorded. The blend should be completely reconstituted, that is, there should be no precipitates, and a clear, stable solution should be attained following this process. In a number of experiments not reported herein it was found that various samples of commercially produced barium sulfonates did not pass the "blend test." Furthermore, various samples of barium sulfonates prepared from petroleum sulfonic acids and distributed as lubricating oil additives were found to fail both the blend test and the concentrate test. Barium petroleum sulfonates prepared and purified in accordance with this invention, even though allowed to stand for long periods of time or subjected to extended adverse storage conditions, were found to pass both the blend and concentrate water susceptibility tests. Where the term "water susceptibility test" is used in this specification, reference is made to either or both of the tests.

The invention is illustrated by the following examples:

*Example I*

A finished neutral oil, having a viscosity of 200 SUS at 210° F., a viscosity index of 85, and obtained from a Mid-Continent naphthenic-type crude by solvent refining procedures was first diluted with two volumes of ethylene chloride, and then was treated with 6 wt. percent of sulfur trioxide diluted with 3 volumes of ethylene chloride at an initial reaction temperature of −25° C. The resulting reaction product was neutralized with an aqueous solution of barium hydroxide in an amount equal to 85 mole percent of the $SO_3$ used. The solvent and water were removed by heating to 350° F. with nitrogen stripping, and the resulting neutralized product was filtered through diatomaceous earth. A fairly clear product was obtained which passed the water susceptibility test as a concentrate, but did not pass the test when blended with mineral oil.

Example I shows that filtering alone, even with the use of a single solvent, without the separation of the aqueous phase to remove the inorganic impurities is inadequate.

*Example II*

A petroleum sulfonic acid reaction product was prepared from the same finished neutral oil used in Example I, diluted with an equal volume of ethylene chloride, by reaction with 6 wt. percent of sulfur trioxide dissolved in 10 volumes of ethylene chloride, at an initial temperature of −25° C. The mixture of ethylene chloride, sulfonic acid, and oil was contacted with 25 volume percent (based on oil) of water. A water phase and a relatively stable emulsion of water, solvent, and crude sulfonic acid formed so that it was necessary to remove water by means in addition to simple settling and decantation. The emulsion was dried by filtering through filter paper and the water-free sulfonic acids were then neutralized by treatment with a filtered aqueous solution of barium hydroxide. Eighty-five mole percent (based on $SO_3$ used) of purified barium hydroxide was used. The water and solvent were then removed by heating as before. The clear product so obtained passed the water susceptibility test, both as a concentrate and in blends.

Example II shows that although emulsion difficulties may be encountered, they are overcome by the substantially complete removal of the water phase with the single solvent present, prior to neutralization.

*Example III*

The finished neutral oil charged in the preceding examples was transformed into a sulfonic acid reaction mixture by treatment with 6 weight percent of sulfur trioxide diluted with 5 volumes of sulfur dioxide. The finished neutral oil in this instance was diluted with 2 volumes of sulfur dioxide prior to treatment with the sulfur trioxide. Following completion of the sulfonation reaction at −10° C., one volume of methyl isobutyl ketone per volume of sulfonic acid-oil mixture was added and the sulfur dioxide was stripped off by means of nitrogen stripping. Water in an amount of 20 volume percent of the oil was added, and the mixture was agitated for 2 minutes. Most of the water separated from the mixture by gravity and was drawn off. The remainder of the water was then separated from the mixture by centrifuging. The water-free mixture of solvent, sulfonic acid, and oil was then neutralized using 85 mole percent (based on $SO_3$ used) of barium hydroxide dissolved in water. The solvent and water were removed by heating the mixture to 350° F. for 30 minutes with nitrogen stripping. The clear product thus produced, and the lubricating oil blends thereof, passed the water susceptibility tests.

Example III shows a preferred embodiment of the invention wherein the diluent, $SO_2$, used in the sulfonation step to modify the action of the $SO_3$, boils well below the single solvent and the various phases are thereby easily separated.

*Example IV*

The finished neutral oil charged in the preceding examples was made into a sulfonic acid reaction mixture by diluting it with 2 volumes of liquid sulfur dioxide and adding 6 wt. percent of sulfur trioxide dissolved in 10 volumes of sulfur dioxide. The mixture of oil and sulfur dioxide was agitated violently during the addition of the mixture of sulfur dioxide and sulfur trioxide. One volume of methyl isobutyl ketone was added to the reaction mixture after the reaction was complete, and the sulfur dioxide was allowed to evaporate from the mixture. The mixture was then stripped with inert gas to assure complete removal of sulfur dioxide, and the amount of methyl isobutyl ketone lost in this operation was replaced by the addition of fresh solvent. The mixture of oil, sulfonic acids, and solvent was then treated with about 0.1 volume of water per volume of mixture and a water phase was removed after settling. About 3.6 volume percent of water was retained in the mixture. The resulting sulfonic acid phase recovered was clear even though water removal was not complete. The sulfonic acids in this phase were then neutralized with a theoretical excess of barimu hydroxide and the solvent and water were removed. A clear product was obtained by filtering the mixture, free of solvent and water, through diatomaceous earth. As a concentrate, however, this product failed the water susceptibility test. From this, it is evident that all of the water phase must be removed before neutralization.

*Example V*

It was found that a solvent consisting of amyl alcohol and benzene was unsatisfactory for use in this process by an experiment in which the finished neutral oil charged in the preceding examples was made into a sulfonic acid reaction mixture by the method of Example IV. Sulfur dioxide was then removed from the reaction mixture and the mixture was taken up in five volumes of an amyl alcohol-benzene solvent per volume of mixture. The resulting solution was washed several times with 0.1 volume of water per volume of solution, and was then neutralized with barium hydroxide. An unsatisfactory, cloudy product was obtained when the solvent and water were removed. This example illustrates the ineffectiveness of a known prior art solvent for attaining our purpose.

A separate portion of the sulfonic acid-oil mixture was dissolved in benzene and an attempt was made to treat the resulting solution with various volumes of water, but a stable emulsion containing all of the water was formed. Thus it is seen that the use of a particular single solvent, which is capable of forming a homogeneous mixture with the reaction products, and the use of sufficient water to remove the inorganic materials, are critical to the success of the invention.

*Example VI*

The finished neutral oil charged in the preceding examples was made into a sulfonic acid reaction mixture by first diluting it with 3 volumes of ethylene chloride per volume of oil, and then treating it with 4% by weight of sulfur trioxide (in 20 volumes of ethylene chloride per volume of sulfur trioxide) at −10° C. The mixture was stripped with nitrogen until free of sulfur dioxide, and was then mixed with 7.7% by volume (based on oil) of water. All of the water was taken up in the reaction mixture.

This water-containing mixture was then divided into two portions, and the water phase was removed from one of these portions by absorption in filter paper. The acids were neutralized by adding a theoretical excess of barium hydroxide octahydrate, and, after the solvent and water were removed, the finished sulfonate, obtained in a yield of 79.4 mole percent, passed both water susceptibility tests. This again illustrates that the use of sufficient water to remove the impurities followed by thorough removal of the water used in washing, before neutralization, gives superior products.

*Example VII*

The other portion of the mixture of oil, sulfonic acids, solvent, and water from Example VI was mixed with another 7.7% by volume of water, and the water phase which separated was withdrawn. This water addition and withdrawal was repeated several times, with the amount of recovered water increasing until the final withdrawal was about equal to the amount last added. The acids were then neutralized with a theoretical excess of barium hydroxide octahydrate and, after the solvent and water had been removed, the finished sulfonate passed both water susceptibility tests. Sulfonate yield was 76.2 mole percent.

*Example VIII*

The procedure of Example IV was followed exactly except that isopropyl ether was used in place of methyl isobutyl ketone. Again a good separation of a water phase was obtained, but 6.9 v. percent of water remained in the solvent phase. The solvent phase was divided into two parts. One part was neutralized and finished as usual and a clear product was obtained. This product did not pass the water susceptibility test since it failed as a concentrate, although it was satisfactory as a finished blend.

The second part was dried by extracting the water with filter paper. The acids were then neutralized and finished as in Example IV. The finished additive passed the water susceptibility test.

The use of the higher boiling ethers, as in the case of the ketones, reduces the amount of water retained in the solvent phase.

In summary, these experiments and discussions thereon show that acceptable products are not formed if: (1) the neutralization is carried out without prior washing of the sulfonic acid-containing reaction mixture: (2) if the water used in washing is of insufficient quantity or is not completely removed before neutralization: (3) when certain mixtures of solvents are used: and/or (4) if certain solvents other than a member of the preferred class are used.

In accordance with the foregoing examples, it is seen that by conducting the purification of the sulfonic acid-containing reaction mixture by water treatment in the presence of certain single solvents, the formation of complete emulsions is prevented, complete removal of the water phase is facilitated and products are obtained which pass the water susceptibility test. The process of this invention may be carried out by using two procedures: In the first and preferred technique, sulfur trioxide is used as the sulfonating agent and ethylene chloride is used as the diluent for the oil phase. The sulfur dioxide formed in the reaction or added as a diluent for the sulfur trioxide is stripped off, followed by the water-washing step. In this technique only those solvents inert to sulfur trioxide may be used, which excludes ketones and ethers. In the second procedure, the sulfonation is carried out using a sulfur trioxide-sulfur dioxide mixture and the sulfur dioxide is removed either in the presence or absence of the solvent. If this removal or stripping is in the presence of a solvent, the water-wash step completes the purification. Where no solvent is present during the sulfur dioxide stripping, such solvent is added after the stripping step and the mixture is water-washed to complete the purification.

It is seen that the single solvent, if inert to sulfur trioxide, may be present during the sulfonic acid-forming reaction or, if reactive with sulfur trioxide, it may be added after completion of the reaction with the sulfonating agent as in Example II. It is apparent that even though a relatively stable emulsion with some water may be formed prior to the neutralization step, a satisfactory purification may be achieved by using successive water washing, centrifuging, or blotter pressing to remove this water. The process of this invention is applicable to the preparation of sulfonic acids wherein the single solvent, such as ethylene chloride, is present during the reaction, or a diluent such as sulfur dioxide is present. In this latter instance, the additional step of removing the sulfur dioxide either before or after the addition of the single solvent in accordance with this invention may be practiced.

The improved purification process of our invention may be applied to hydrocarbon oil-sulfonating agent reaction mixtures using an oil containing at least 10% to 40% of sulfonatable material and capable of producing oil-soluble sulfonates as described in the prior art. The sulfonating agent may be sulfur trioxide, sulfuric acid, or mixtures of acid and sulfur trioxide. The reaction product to be purified may result from the reaction of a hydrocarbon oil and a sulfonating agent under a broad range of conditions. The temperature of the sulfonation reaction may vary from −30° F. to 100° F. or higher. In using sulfur trioxide as the sulfonating agent, the optimum reaction conditions are about −30° F. to 40° F. under which conditions a minimum amount of insoluble impurities is obtained. Various petroleum oil fractions may be used as the feed oil for the process. including lubricating oil fractions, both refined and unrefined. Refined neutral lubricating oils and bright stocks are good starting materials. The reaction may be carried out in a batch or continuous manner.

In general, the single solvent used in carrying out the invention is selected from the group of saturated alkyl ketones of the formula

wherein R and R' are saturated alkyl groups having from 1 to 8 carbon atoms and the sum of the carbon atoms in these alkyl groups is at least 4 and no greater than 9; ethers of the general formula, R—O—R', where R and R' have a total of at least 5 but not more than 9 carbon atoms; and certain halogenated hydrocarbons, having more than one carbon atom, boiling below the boiling point of the sulfonic acid reaction mixture and containing one or more halogen atoms. Specific members of the saturated alkyl ketones having a total of 4 carbon atoms in the alkyl groups include methyl n-propyl ketone, methyl isopropyl ketone and diethylketone as examples. Those saturated alkyl ketones having a total of 5 carbon atoms in the alkyl groups include methyl n-butyl ketone, ethyl n-propyl ketone, methyl isobutyl ketone, ethyl isopropyl ketone, methyl sec.-butyl ketone, and methyl tert-butyl ketone as examples. Dipropyl ketone and diisopropyl ketone are examples of solvents within the general class which have a total of 6 carbon atoms in their alkyl groups. Similarly, hexamethyl acetone, having a total of 8 carbon atoms in the alkyl groups and butyl n-pentyl ketone having a total of 9 carbon atoms in the alkyl groups, may be used. This definition excludes methyl ethyl ketone, acetone and lower boiling ethers. The preferred species of this group of ketones include methyl isobutyl ketone, methyl n-propyl ketone, diethyl ketone, dipropyl ketone, and methyl isobutyl ketone.

The preferred species of ethers include n-propyl ether, isopropyl ether, ethyl n-propyl ether. Mixed primary-tertiary and secondary-tertiary ethers obtained by reaction of primary or secondary alcohols with olefins related to the tertiary alcohols in the presence of an acidic catalyst, may also be used, such as methyl tertiary-butyl ether and diisobutyl ether.

The monohalogen derivatives of paraffins such as ethyl chloride, bromide, and iodide; n-propyl chloride, bromide and iodide; isopropyl chloride, bromide and iodide; n-butyl bromide, chloride and iodide; sec.-butyl bromide, chloride and iodide, the latter boiling at 248° F., may be used. Similarly, isobutyl chloride, bromide and iodide; tert.-butyl chloride, bromide and iodide; n-amyl chloride, bromide and iodide; tert.-amyl chloride, bromide and iodide; neopentyl chloride, bromide and iodide; and n-hexyl fluoride, bromide and iodide, the latter boiling at 338° F., may be used. Other specific examples of monohalo-paraffins having boiling points below the boiling point of the sulfonic acid mixture are n-heptyl fluoride, n-heptyl chloride, n-heptyl bromide, n-octyl fluoride and n-octyl chloride. The primary alkyl halides are preferred because of their chemical and thermal stability. Tertiary halides containing more than 6 carbon atoms are unstable and therefore unsuitable. The saturated dihalides containing more than one carbon atom such as the ethylidene halides, ethylene halides, ethylene chlorobromide, ethylene chloroiodide, propylidene halides, propylene halides, trimethylene halides and the trihalides such as methyl chloroform, 1,1,2-trichloroethane and glyceryl chloride, having the aforementioned boiling characteristics, may be used. The ketone and halide solvents used must be inert, must be miscible with the oil phase, and must not be soluble to any appreciable extent in any water phase present. Ethylene chloride and ethylene bromide are the preferred halogenated hydrocarbon solvents for the process. Carbon tetrachloride and high boiling halogenated hydrocarbons are not suitable solvents for the process.

The metal base used in the neutralization step may be any hydroxide or oxide of a group II metal such as calcium, strontium, or barium. Other metal salts such as carbonates, acetates and chlorides of magnesium, cadmium or other metals may be used with appropriate changes in neutralization conditions as are known in the art.

In carrying out the invention, if the sulfonating agent is sulfur trioxide dissolved in sulfur dioxide, the single solvent may be added to the reaction mixture containing petroleum sulfonic acids either before or after the sulfur dioxide is removed. The sulfur dioxide may be removed by any of the well-known expedients for this purpose. One method is to heat the reaction mass to a temperature of about 100 to 150° F. and bubble nitrogen or other inert gas through the heated mixture. Removal of the sulfur dioxide is facilitated by reduced pressures. The amount of single solvent used is dependent on the nature of the petroleum sulfonic acid-containing reaction mixture. Ordinarily, about 100 to 300 vol. percent of solvent, based on the volume of the reaction mass, is sufficient to bring the mixture into homogeneity. Excessive amounts of solvent are to be avoided since this makes solvent recovery unduly complex. If the solvent is added prior to removal of the sulfur dioxide diluent which, if used, is present in amounts varying from 5 to 300 vol. percent based on the amount of oil in the reaction mixture, it has been found that complete removal of the sulfur dioxide diluent is facilitated. When sulfur dioxide is used as the diluent for only the sulfur trioxide, it will generally be present in amounts as low as 5% v. of the oil, but if it is used as a diluent for both the sulfur trioxide and oil streams, it may be present in amounts as great as 300% v. of the oil.

A distillation step to recover the bulk of the sulfur dioxide may be used after the addition of solvent and prior to the first stripping operation in processes wherein sulfur dioxide is used. Also, using this method, an additional amount of solvent may be added if it is found that the reaction mass is not homogeneous at this point in the procedure.

The amount of water used in the water-wash step will vary. Generally, only one application of about 1 volume of water per 10 volumes of reaction product-solvent mixture is necessary. This step is carried out at ambient temperatures. When excessive amounts of impurities, including organic acids other than sulfonic acids, inorganic salts, etc., are present, a second or third water wash may be necessary. Using the present method, the separation of the oil-solvent phase containing the desired mahogany sulfonic acids and the bulk of the water phase containing the impurities takes place within a few seconds. However, traces of water which also contain undesirable impurities may remain suspended in a colloidal state in the oil-solvent phase. This retained water phase must be removed by drying with filter paper or other adsorbent filter medium or by centrifuging at high centrifugal force levels. About 2,000 gravities were found to be adequate. An alternative method is to remove as much as possible of the water used in the first water washing by subsequent water washes to displace the dispersed aqueous phase which was not removed by settling. This results in a reduction in yield of total product because of the extraction of desirable products by the successive water washes, and is therefore not preferred. This effect is magnified in the case of some of the more water-soluble solvents, but is not of undesirable magnitude with ethylene chloride as the solvent.

What is claimed is:

1. The process for the preparation and purification of petroleum sulfonic acids which comprises reacting a petroleum oil containing about 10 to 40% of sulfonatable material with a sulfonating agent selected from the group consisting of sulfur trioxide, sulfuric acid and mixtures thereof at a temperature of between about −30° F. to 100° F. in the presence of a diluent, recovering a reaction mixture containing petroleum sulfonic acids and undesired impurities from said reaction, adding to said reaction mixture between about 50% to 300% by volume based on the total amount of petroleum oil in said reaction mixture of a single mutual solvent selected from the group consisting of ketones containing a total of 5 to 10 carbon atoms per molecule, ethers containing about 5 to 9 carbon atoms per molecule and chlorinated hydrocarbons containing more than 1 carbon atom per molecule, said solvents being further characterized by having a boiling point above the boiling point of said diluent and below the boiling point of said reaction mixture and forming a homogeneous solution of said reaction mixture, removing said diluent from said homogeneous reaction solution, adding to said homogeneous solution about 0.1 to 1 volume of water per 10 volumes thereof, removing a water phase consisting essentially of all of said added water along with said impurities from said reaction solution and recovering an oil phase of purified petroleum sulfonic acids.

2. The process in accordance with claim 1 in which the diluent is sulfur dioxide and said mutual solvent is methyl isobutyl ketone.

3. The process in accordance with claim 1 in which said diluent and said mutual solvent are ethylene chloride.

4. The process in accordance with claim 1 in which said oil phase of petroleum sulfonic acids is reacted with a stoichiometric excess of a basic metal compound to form the basic metal salt thereof and said salts are characterized by their ability to pass the water susceptibility tests.

5. The process in accordance with claim 4 in which said basic metal compound is selected from the group consisting of barium hydroxide, calcium hydroxide and strontium hydroxide.

6. The process in accordance with claim 5 in which said basic metal compound is barium hydroxide.

7. The method in accordance with claim 1 in which the sulfonating agent is sulfur trioxide.

8. A process in accordance with claim 1 in which the ketone is methyl isobutyl ketone.

9. A process in accordance with claim 1 in which the ether is isopropyl ether.

10. A process in accordance with claim 1 in which the chlorinated hydrocarbon is ethylene chloride.

11. The method in accordance with claim 1 in which the petroleum oil is a refined lubricating oil.

12. The method in accordance with claim 1 in which said diluent is sulfur dioxide and the single solvent is added after the sulfur dioxide is stripped from the reaction mixture and before the treatment with water to remove the inorganic impurities.

References Cited in the file of this patent

UNITED STATES PATENTS

| | | |
|---|---|---|
| 2,236,933 | Beck | Apr. 1, 1941 |
| 2,304,230 | Archibald et al. | Dec. 8, 1942 |
| 2,413,311 | Cohen | Dec. 31, 1946 |
| 2,689,221 | Bray | Sept. 14, 1954 |
| 2,769,836 | Gilbert et al. | Nov. 6, 1956 |
| 2,783,273 | Verley | Feb. 26, 1957 |